United States Patent
Fees et al.

(10) Patent No.: US 7,481,367 B2
(45) Date of Patent: Jan. 27, 2009

(54) ASSIGNMENT OF MARKDOWN PROFILES FOR AUTOMATED CONTROL OF PRICING

(75) Inventors: Harald Fees, Ottweiler (DE); Thomas Veit, Kirchheimbolanden (DE); Ines Wannemacher, Saarbrucken (DE); Susanne Ziehl, Blieskastel (DE)

(73) Assignee: SAP Aktiengesellschaft, Walldorf (DE)

( * ) Notice: Subject to any disclaimer, the term of this patent is extended or adjusted under 35 U.S.C. 154(b) by 323 days.

(21) Appl. No.: 10/919,025

(22) Filed: Aug. 16, 2004

(65) Prior Publication Data

US 2005/0194431 A1     Sep. 8, 2005

Related U.S. Application Data

(60) Provisional application No. 60/551,221, filed on Mar. 8, 2004, provisional application No. 60/563,284, filed on Apr. 16, 2004.

(51) Int. Cl.
    *G06K 15/00* (2006.01)
(52) U.S. Cl. ........................... 235/383; 235/378
(58) Field of Classification Search ............ 235/375, 235/383, 378; 705/14, 26
    See application file for complete search history.

(56) References Cited

U.S. PATENT DOCUMENTS

| | | | |
|---|---|---|---|
| 5,400,253 | A | 3/1995 | O'Connor |
| 5,930,771 | A | 7/1999 | Stapp |
| 6,507,851 | B1 | 1/2003 | Fujiwara et al. |
| 6,910,017 | B1 | 6/2005 | Woo et al. |
| 6,976,001 | B1 | 12/2005 | Levanoni et al. |
| 6,980,966 | B1 | 12/2005 | Sobrado et al. |

(Continued)

FOREIGN PATENT DOCUMENTS

JP    2004-030343 A    1/2004

OTHER PUBLICATIONS

U.S. Appl. No. 60/374,892, filed Apr. 22, 2002, Russell Krajec.

(Continued)

*Primary Examiner*—Karl D Frech
*Assistant Examiner*—April A Taylor
(74) *Attorney, Agent, or Firm*—Foley & Lardner LLP

(57) ABSTRACT

The present invention discloses a method, program product and system for controlling pricing using a markdown profile, where the method of the present invention includes: selecting a markdown profile based on an attribute of a product to be used for the sale of that product; selecting a retail price for the product; acquiring updated sales data regarding the product; and determining a markdown to be applied to the retail price from the markdown profile using the updated sales data. The method can further include the step of adjusting a retail price of the product by the markdown. The present invention also provides a data structure implementing a markdown profile for determining retail price adjustments for a product, where the data structure includes: an actual sales quota parameter; a posting period parameter arranged perpendicular to the actual sales quota parameter; a plurality of data fields containing markdowns, each data field corresponding to a specific posting period and actual sales quota range and each markdown relating to an amount of adjustment of a retail price for the product; and an attribute field containing product attribute data used to determine the relevance of the markdown profile to the product.

25 Claims, 2 Drawing Sheets

U.S. PATENT DOCUMENTS

| | | | |
|---|---|---|---|
| 7,092,929 B1 * | 8/2006 | Dvorak et al. | 705/28 |
| 7,117,165 B1 | 10/2006 | Adams et al. | |
| 7,130,822 B1 | 10/2006 | Their et al. | |
| 7,139,731 B1 | 11/2006 | Alvin | |
| 7,155,402 B1 * | 12/2006 | Dvorak | 705/10 |
| 2001/0047308 A1 * | 11/2001 | Kaminsky et al. | 705/26 |
| 2002/0023500 A1 | 2/2002 | Chikuan et al. | |
| 2002/0078159 A1 | 6/2002 | Petrogiannis et al. | |
| 2002/0107713 A1 | 8/2002 | Hawkins | |
| 2002/0147668 A1 | 10/2002 | Smith et al. | |
| 2003/0023500 A1 * | 1/2003 | Boies et al. | 705/26 |
| 2003/0028437 A1 * | 2/2003 | Grant et al. | 705/26 |
| 2003/0046195 A1 | 3/2003 | Mao | |
| 2003/0158791 A1 | 8/2003 | Gilberto et al. | |
| 2003/0172007 A1 | 9/2003 | Helmolt et al. | |
| 2003/0229502 A1 | 12/2003 | Woo | |
| 2004/0098358 A1 | 5/2004 | Roediger | |
| 2004/0162763 A1 | 8/2004 | Hoskin et al. | |
| 2004/0186783 A1 | 9/2004 | Knight et al. | |
| 2004/0220861 A1 | 11/2004 | Morciniec et al. | |
| 2005/0055283 A1 | 3/2005 | Zarovinsky | |
| 2005/0060270 A1 | 3/2005 | Ramakrishnan | |
| 2005/0086122 A1 | 4/2005 | Cirulli et al. | |
| 2005/0096963 A1 | 5/2005 | Myr et al. | |
| 2005/0102192 A1 | 5/2005 | Gerrits et al. | |
| 2005/0102227 A1 | 5/2005 | Solonchev | |
| 2005/0165659 A1 | 7/2005 | Gruber | |
| 2006/0036507 A1 | 2/2006 | Pujar et al. | |

OTHER PUBLICATIONS

ProfitLogic, available at http://web.archive.org/web/20020603111838/http://profitlogic.com/, available at least by Apr. 15, 2005 (22 pp.).

Subrahmanyan et al., "Developing optimal pricing and inventory policies for retailers who face uncertain demand", *Journal of Retailing*, vol. 72, No. 1, Spring, 1996 (p. 7 (24)).

"Beyond Markdown Management", summer/autumn 03, the 4caster, Iss 4, vol. 2.

"Retailers Manage Markdown Challenges Using i2 Solutions", Jan. 13, 2003, NFR 92nd Annual Convention & Expo, 2 pgs.

Author unknown, "Staffware And Biomni Join Forces To Provide End-To-End E-Procurement Solution With Enhanced Workflow Capability: Self-Service Functionality Will Enable Thousands Of Transactions To Be Handled Daily From The Desktop," M2 Presswire, Coventry, Feb. 6, 2001, p. 1.

Melcher, Rachel, "Local tech firm creates retail markdown tool", Mar. 24, 2000, Cincinnati Business Courier, 3 pgs.

* cited by examiner

ASSIGNMENT OF MARKDOWN PROFILES FOR AUTOMATED CONTROL OF PRICING

CROSS-REFERENCE TO RELATED PATENT APPLICATIONS

This application claims the benefit of U.S. Provisional Application No. 60/551,221, filed Mar. 8, 2004 and entitled "Inventory Management," and U.S. Provisional Application No. 60/563,284, filed Apr. 16, 2004 and entitled "Inventory Management," both of which are hereby incorporated by reference.

BACKGROUND OF THE INVENTION

A. Field of the Invention

The present invention is directed to the field of retail pricing and specifically to the assignment of markdown profiles and automated pricing to reach sales quotas.

B. Background

Effective pricing of goods that are made available for sale is often a complicated task. In order to maximize profits, not only must revenue be optimized, but also the costs of inventory must be taken into account. One strategy used is to periodically reduce the price of the goods, effecting a markdown, in order to encourage sales of the goods. The amount of the markdown is often set by a sales agent who has had experience in the market for the goods and can, using his or her experience and intuition determine the timing and amount of markdowns.

In particular, the sale of seasonal goods poses a high financial risk for merchants. Each seasonal article can be assigned a specific sales period. When high-fashion and fashion articles are involved, the merchant wants to have as little remaining stock as possible at the end of the sales period, as it will be difficult to sell this merchandise even with markdowns. In this case, larger remaining stocks translate to higher losses. In addition to fashion articles, such as pink raincoats, this also applies to other goods, such as computer hardware.

For less "fashionable" products, the risk is lower because merchants can store any remaining stock and then try to sell it at the normal price again in the same season of the next year. Because storing inventories is expensive, however, merchants will generally prefer to sell their merchandise by the end of the regular sales period.

Merchants use markdowns to ensure that the merchandise is sold out as completely as possible by the end of a season. Markdowns are price reductions or buyer's incentives aimed at promoting the sale of certain articles. Of course, markdowns reduce the gross margin, which means the revenue merchants earn for selling the merchandise is less than originally planned. Merchants usually plan a certain budget for markdowns that must not be exceeded. Accordingly, markdowns are applied restrictively in retail, which once again increases the risk of remaining stocks at the end of the season.

Therefore, the primary goal in managing seasonal merchandise is to limit markdowns to a minimum and apply them at the best suitable time, while ensuring that nearly all the merchandise is sold by the end of the season.

SUMMARY OF THE INVENTION

The present invention discloses a method, program product and system for controlling pricing using a markdown profile, where the method of the present invention includes: selecting a markdown profile based on an attribute of a product to be used for the sale of that product; selecting a retail price for the product; acquiring updated sales data regarding the product; and determining a markdown to be applied to the retail price from the markdown profile using the updated sales data. The method can further include the step of adjusting a retail price of the product by the markdown.

The present invention also provides a data structure implementing a markdown profile for determining retail price adjustments for a product, where the data structure includes: an actual sales quota parameter; a posting period parameter arranged perpendicular to the actual sales quota parameter; a plurality of data fields containing markdowns, each data field corresponding to a specific posting period and actual sales quota range and each markdown relating to an amount of adjustment of a retail price for the product; and an attribute field containing product attribute data used to determine the relevance of the markdown profile to the product.

Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The foregoing advantages and features of the invention will become apparent upon reference to the following detailed description and the accompanying drawings, of which.

DETAILED DESCRIPTION OF THE INVENTION

As mentioned above, the primary goal in managing seasonal merchandise is to limit markdowns to a minimum and apply them at the best suitable time, while ensuring that nearly all the merchandise is sold by the end of the season. The present invention, as defined in detail herein, is a tool that supports a pricing agent's work during the ongoing retail season. The agent forms a correspondence between an article and markdown profile. This markdown profile contains time-specific target data for selling an article during its retail life cycle. The sales data of an article that sold well in the previous year, for example, could be used as the target sales quota in a markdown profile. The markdown profile is tied to a pricing strategy, which dictates specific price reductions when the actual sales data deviates from the target data. As a result, the system is capable of monitoring the sales data automatically and notifying the agent of any exceptions that occur. In addition, the system can propose certain markdowns in order to reach the planned sales figures. In this approach, the agent is relieved from a large portion of the activities he or she usually has to perform. Using the markdown profile, the agent can obtain proposed markdowns for a given product at periodic intervals over the life cycle of the sale of that product. The agent can choose to accept or reject the proposals, but it is envisioned that in most cases, the proposals will be accepted and the goal of ensuring that nearly all the merchandise is sold by the end of the season is achieved.

Figure 1:
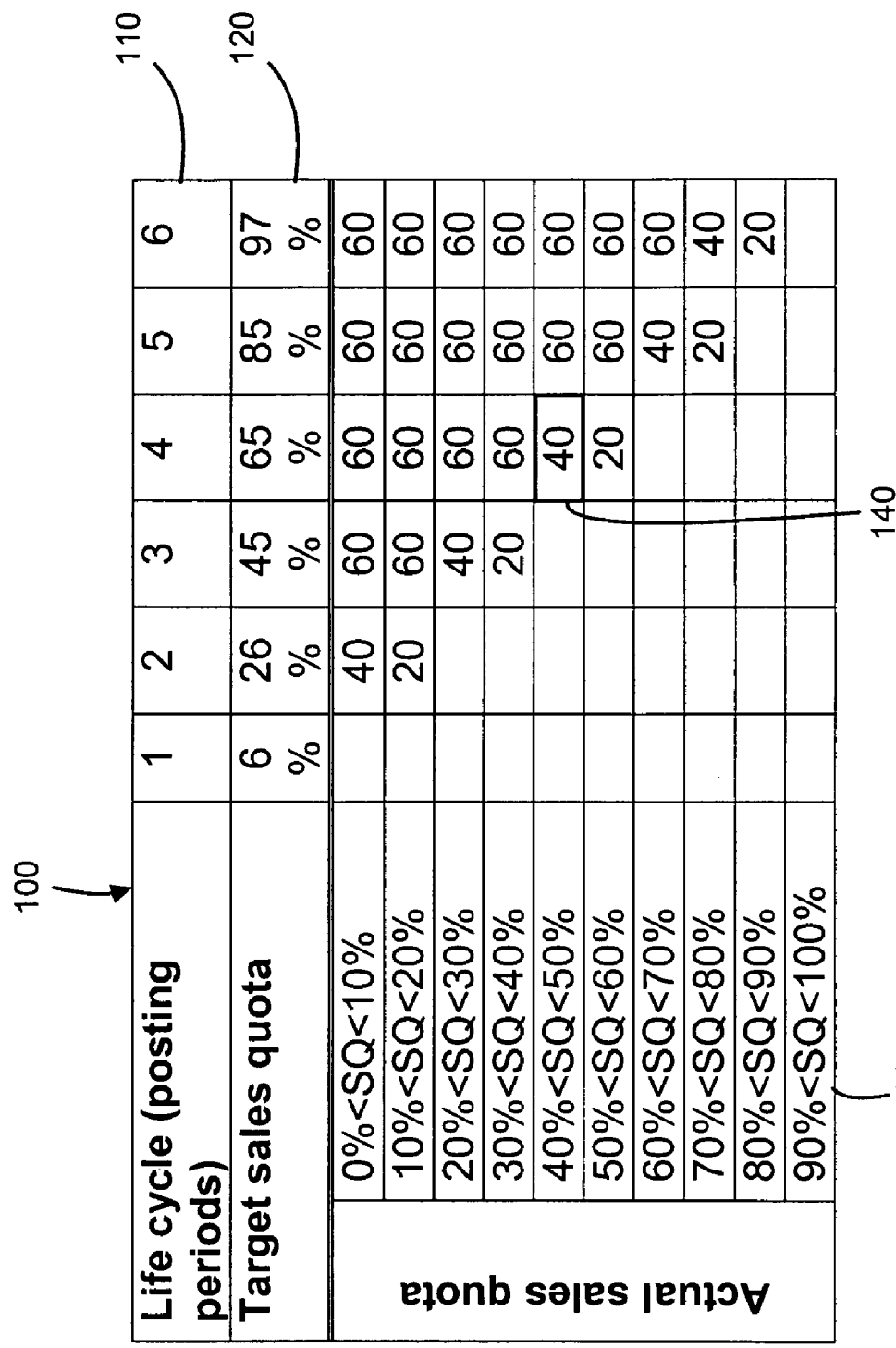
FIG. 1 illustrates a markdown profile in accordance with a preferred embodiment of the invention.

The structure of the markdown profile in the preferred embodiment of the invention is illustrated in FIG. 1. The markdown profile 100 specifies the target sales figures for the product, that is, the sales quotas for which no markdowns are needed. These target sales quotas are shown in row 120 in FIG. 1. The target sales quotas are shown in connection with a time reference which can represent a retail life cycle of the product. In FIG. 1, the target sales quotas 120 are shown in connection with corresponding numbered time periods 110 over the life cycle of the product, also known as posting periods. For example, a posting period may correspond to a week in the season of the product.

The target sales quotas are expressed as percentages in the markdown profile shown in FIG. 1. These percentages represent the quantity of the goods sold divided by the quantity of the goods available for sale. Thus, in the example shown in FIG. 1, at the end of the first posting period the target sales quota is six percent. At the end of the second posting period the target sales quota is 26 percent. By the end of the sixth posting period, most of the retail product, that is 97 percent, is targeted to have been sold. As shown in the markdown profile in FIG. 1, these target sales quotas are arranged along an axis in the table. Arranged perpendicular to the target sales quota axis is a plurality of rows representing ranges of actual sales quotas. These are shown as column 130 in FIG. 1. As with target sales quota, actual sales quota is calculated by taking the actual quantity of goods sold and dividing it by the quantity of goods available for sale. Each of the ten ranges of actual sales quota shown in column 130 represent 10 percent intervals. It would apparent to one skilled in the art that any number of ranges or actual percentages could be used. The thresholds for the actual sales quota can be freely defined by the user.

In the markdown profile, at the intersection of each actual sales quota range and each target sales quota corresponding to a posting period lies a cell which contains the proposed markdown. Cells in which no numbers appear indicate that no markdown is proposed. For cells in which numbers do appear, the number indicates the proposed markdown percentage. For example, assume that the markdown profile shown in FIG. 1 is being used for a retail product that has been on sale for four posting periods (or four weeks). The sales quota targeted for this product is 65 percent, as shown in target sales quota row 120. Now assume that sales of this product have not met the targeted sales quota and, instead, only 235 out of the 500 items that were in stock have sold. This corresponds to an actual sales quota of 47 percent. Thus, using the markdown profile with the actual sales quota of 47 percent falling within the range of 40 percent to 50 percent, we look to the cell found at the intersection of this actual sales quota range with the target sales quota column of 65 percent and find the number 40 in cell 140. This indicates a proposed markdown of 40 percent.

Thus, in the example described above, the system would indicate to the user that a markdown of 40 percent of the original retail price is proposed. The user can then accept or reject this proposal. In an alternate embodiment of the invention, the proposed markdown from the markdown profile is automatically implemented to adjust the retail price of the product. The user can override this automatic adjustment. The process is repeated at subsequent posting periods over the retail life cycle of the product.

While percentage markdowns are shown in the markdown profile illustrated in FIG. 1, it is envisioned that other types of buying incentives could be used instead of a simple percentage markdown of retail price. For example, a markdown profile could propose a distribution of a coupon in order to encourage sales to achieve the target sales quota.

It is important to note that the computer system on which the markdown profile is running and implemented has access to the data necessary to propose the markdown to the user. That is the system has access to the actual sales from the relevant store or stores for the relevant product or products during the relevant posting periods. It is envisioned that multiple markdown profiles would be provided to the user. These multiple profiles would correspond to different types of products or perhaps would be specific to individual products. The user could also create new profiles or revise existing profiles as desired.

In order to better control pricing for the sale of the retail product under the present invention using markdown profiles, a user would select a markdown profile to be used for the retail product at issue. The user would also select the initial retail price for that product and then as time progressed would adjust the retail price of that product by the markdown determined from the markdown profile as described above. This adjustment could happen multiple times over the life cycle of the product. The system can be programmed to perform the adjusting step at regular intervals such as at the end of each posting period. In this case it is envisioned that for a product selling well no mark-down may be necessary under certain posting periods.

Not shown in FIG. 1 is a data field associated with a markdown profile that pertains to some product characteristic. This data field allows for a markdown profile to be identified as relevant to a specific retail product or to a specific category of retail products. The assignment of a markdown profile to a retail product or products is described in further detail herein.

As mentioned above, the user forms a correspondence between a product to be sold and a markdown profile. In the preferred embodiment of the invention, the user is provided with a plurality of markdown profiles from which to choose in order to select a markdown profile to be used for a particular product. These markdown profiles are prepared in advance of selection. Alternatively, the user can revise an existing markdown profile or even create an entirely new markdown profile to be used for the particular product.

In order to more efficiently search for potentially applicable and relevant markdown profiles, the markdown profile may contain at least one and possibly three or more assignable attribute fields. These fields contain attribute data regarding a product or service. For example, the fields may contain indicators representing the product type (e.g., raincoats), the color, the size, the sales organization (i.e., a grouping of stores, such as by geographic location), and the distribution channel (e.g., U.S. North, U.S. South, Europe Benelux, etc.). Also, there are predefined attribute fields that characterize a markdown profile and allow for searching. Such fields include: fashion grade, season category and season year, article hierarchy id and category. Using the attribute field information, the user can search for the markdown profile that best suits the user's need for a particular product or service.

Different markdown profiles can be prepared to address different reaction strategies and sales profiles. For example, three or more reaction strategies could be provided: aggressive, defensive and normal. These are subjective classifications relating to how quickly you want to reduce the inventory and are determined by, for example, the person determining the values in the markdown profiles. As another example, three or more sales profiles could be provided: linear, progressive and declining. A linear profile, for example, is one where if there is markdown of x at time period y, there would be a markdown of 2x at time period 2y. Different markdown profiles can be prepared to address each of these scenarios.

When selecting from among a plurality of markdown profiles, the user can toggle between them using a single action of a user-input device, such as a pressing a key on a keyboard. This single action would toggle between multiple markdown profiles. In the case of reaction strategies and sales profiles, the single action would toggle between the various versions of the markdown profile.

In forming the correspondence between products and markdown profiles, the user can assign a markdown profile to entire groups or categories of products. For example, one markdown profile can be assigned to all products of a particular type (e.g., raincoats). The user can also more finely correspond specific markdown profiles to sub-groupings of those products. For example, the user could assign a different markdown profile to red raincoats than is assigned to blue raincoats and different than is assigned to the larger category of all raincoats. Indeed, a markdown profile may be specifically tailored for a particular product of a particular color and size. In the preferred embodiment, if an individual product is not separately assigned a specific markdown profile, then the markdown profile for the relevant larger product category will be used for that product.

While, in FIG. 1, the markdown profile is shown as a table, is would be apparent to one skilled in the art that any suitable configuration could be used to convey the same information and all such configurations would be within the scope of the present invention. Furthermore, the markdown profiles can represent information about the sales of a product in a given store or for a group of stores. It could also represent information about the sales of a group or category of products.

Figure 2:
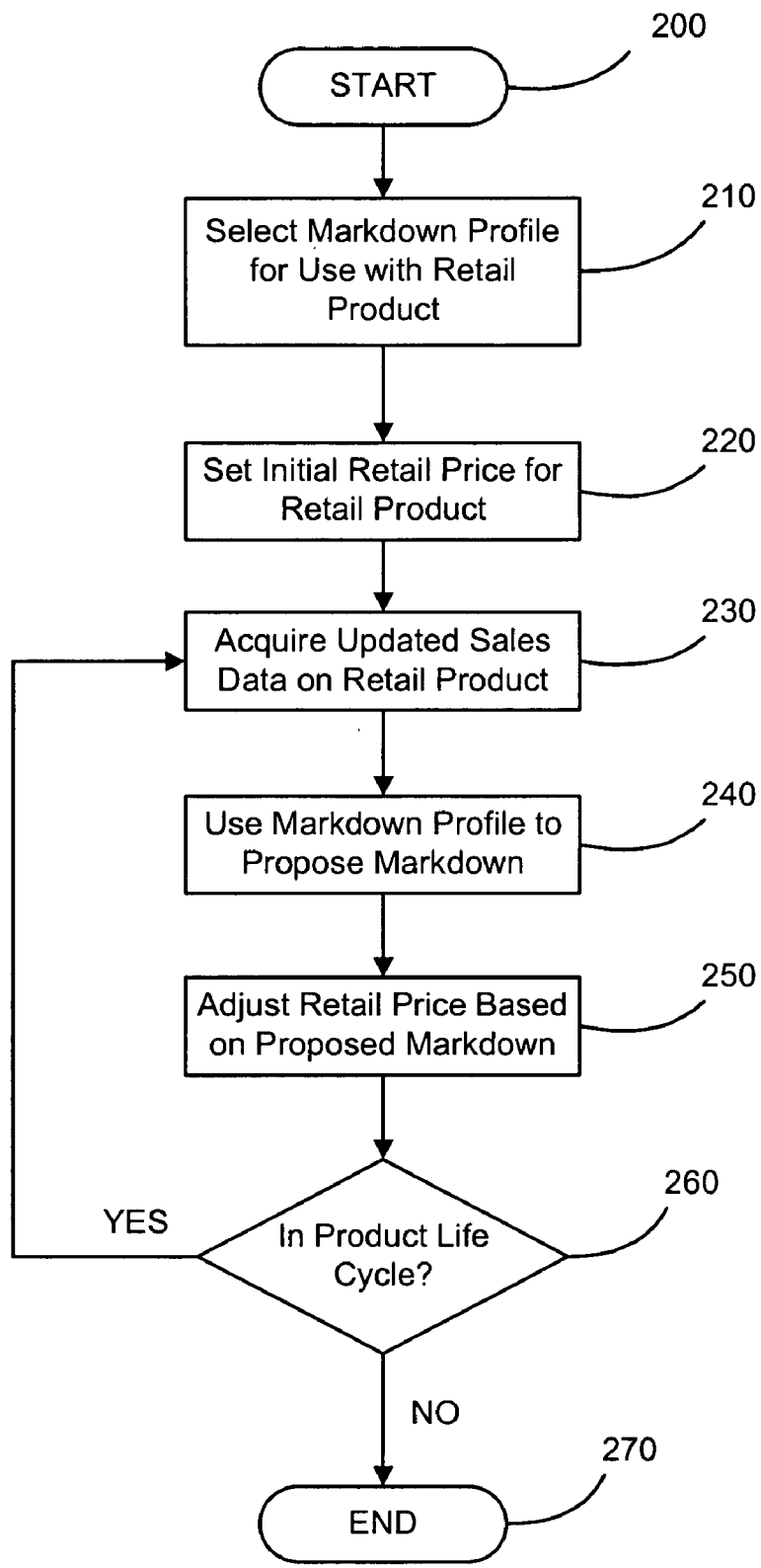
FIG. 2 is a flowchart illustrating basic price control under the present invention.

FIG. 2 illustrates the method of the present invention in a flowchart. The flowchart begins at step 200. In step 210, the user or the system selects a markdown profile to be used for a retail product. In step 220, which may be performed before, after or contemporaneously with step 210, the initial retail price of the product is set. Step 230 illustrates the acquisition of updated sales data after some period of time has elapsed while the product has been on sale. This sales data is used in step 240 in the markdown profile to determine the proposed markdown for the retail product. This proposed markdown can be used to adjust, in step 250, the retail price of the product. In one embodiment of the invention, the proposed markdown is subject to approval or rejection by a user (not shown) and, in the case of rejection, the adjustment step 250 would not need to be performed. In either case, the method returns to acquiring updated sales data, so long as it is still within the product lifecycle, step 260. The frequency of acquiring updated sales data and determining a markdown can be adjusted by the user. In the preferred embodiment, it is performed once per posting period. Once the life cycle of product has been exhausted, it is assumed that the product will not be offered for sale until some later time, if at all, and the use of the markdown profile is ended in step 270.

"Article," "seasonal good," "product" and "retail product" are terms used herein to refer to the merchandise being sold, the pricing for which is controlled or affected by the markdown profile as used in the present invention. It is envisioned that the present invention will be applicable to the sale of any type of good or service.

As noted above, embodiments within the scope of the present invention include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A method of controlling pricing using a markdown profile, comprising:
    selecting a first markdown profile for a product group, the product group comprising a first product and a second product, the first markdown profile configured to compare a first targeted sales amount during at least a first time period to a first markdown amount for the at least first time period;
    setting the first markdown profile as a product category markdown profile for the first product and the second product;
    assigning a second markdown profile to the second product, the second markdown profile configured to compare a second targeted sales amount during at least a second time period to a second markdown amount for the at least second time period;
    selecting a first sales plan;
    selecting a second sales plan;
    selecting a first retail price for the first product;
    selecting a second retail price for the second product;
    acquiring first updated sales data for the first product;
    acquiring second updated sales data for the second product;
    determining at least one of a first exception to the first sales plan and a second exception to the second sales plan based on comparing at least one of the first updated sales data to the first sales plan and the second updated sales data to the second sales plan;
    determining a markdown to be applied to at least one of the first retail price and the second retail price based on at least one of the first updated sales data, the second updated sales data, the first exception and the second exception; and
    adjusting at least one of the first retail price and the second retail price by the markdown.

2. The method of controlling pricing using the markdown profile according to claim 1, wherein the first product and the second product comprise attribute including at least one of product type, color, size, distribution channel and sales organization.

3. The method of controlling pricing using the markdown profile according to claim 1, wherein at least one of the markdown profile, the first markdown profile and the second markdown profile comprises at least one attribute field containing product attribute data used to determine relevance of at least one the markdown profile, the first markdown profile and the second markdown profile to at least one of the first retail product and the second retail product and wherein the selecting of at least one of the markdown profile, the first markdown profile and the second markdown profile is based on the product attribute data.

4. The method of controlling pricing using the markdown profile according to claim 1, wherein the selecting of at least one of the markdown profile, the first markdown profile and the second markdown profile is further based on a reaction strategy for sale of at least one of the first product and the second product.

5. The method of controlling pricing using the markdown profile according to claim 4, wherein the reaction strategy is at least one of aggressive, defensive and normal.

6. The method of controlling pricing using the markdown profile according to claim 1, wherein the selecting of at least one of the markdown profile, the first markdown profile and the second markdown profile is further based on a sales profile for sale of at least one of the first product and the second product.

7. The method of controlling pricing using the markdown profile according to claim 6, wherein the sales profile is at least one of linear, progressive and declining.

8. The method of controlling pricing using the markdown profile according to claim 1, wherein the second markdown profile is specific to the second product.

9. The method of controlling pricing using the markdown profile according to claim 1, wherein the markdown is expressed as percentage discount.

10. The method of controlling pricing using the markdown profile according to claim 1, further comprising the step of providing a user with a plurality of markdown profiles from which to select.

11. The method of controlling pricing using the markdown profile according to claim 10, wherein the selecting step further comprises toggling between a plurality of markdown profiles through a single action by the user.

12. A system for controlling pricing using a markdown profile, comprising:
    means for selecting a first markdown profile for a product group, the product group comprising a first product and a second product, the first markdown profile configured to compare a first targeted sales amount during at least a first time period to a first markdown amount for the at least first time period;
    means for setting the first markdown profile as a product category markdown profile for the first product and the second product;
    means for assigning a second markdown profile to the second product, the second markdown profile configured to compare a second targeted sales amount during at least a second time period to a second markdown amount for the at least second time period;
    means for selecting a first sales plan;
    means for selecting a second sales plan;
    means for selecting a first retail price for the first product;
    means for selecting a second retail price for the second product;
    means for acquiring first updated sales data for the first product;
    means for acquiring second updated sales data for the second product;
    means for determining at least one of a first exception to the first sales plan and a second exception to the second sales plan based on comparing at least one of the first updated sales data to the first sales plan and the second updated sales data to the second sales plan;

means for determining a markdown to be applied to at least one of the first retail price and the second retail price based on at least one of the first updated sales data, the second updated sales data, the first exception and the second exception; and means for adjusting at least one of the first retail price and the second retail price by the markdown.

13. The system for controlling pricing using the markdown profile according to claim 12, wherein the first product and the second product comprise attribute including at least one of product type, color, size, distribution channel and sales organization.

14. The system for controlling pricing using the markdown profile according to claim 12, wherein at least one of the markdown profile, the first markdown profile and the second markdown profile comprises at least one attribute field containing product attribute data used to determine relevance of at least one the markdown profile, the first markdown profile and the second markdown profile to at least one of the first retail product and the second retail product and wherein the selecting of at least one of the markdown profile, the first markdown profile and the second markdown profile is based on the product attribute data.

15. A computer readable medium for controlling pricing using a markdown profile, the computer readable medium comprising machine-readable program code for causing, when executed, one or more machines to perform the following method steps:

selecting a first markdown profile for a product group, the product group comprising a first product and a second product, the first markdown profile configured to compare a first targeted sales amount during at least a first time period to a first markdown amount for the at least first time period;

setting the first markdown profile as a default markdown profile for the first product and the second product;

assigning a second markdown profile to the second product, the second markdown profile configured to compare a second targeted sales amount during at least a second time period to a second markdown amount for the at least second time period;

selecting a first sales plan;

selecting a second sales plan;

selecting a first retail price for the first product;

selecting a second retail price for the second product;

acquiring first updated sales data for the first product;

acquiring second updated sales data for the second product;

determining at least one of a first exception to the first sales plan and a second exception to the second sales plan based on comparing at least one of the first updated sales data to the first sales plan and the second updated sales data to the second sales plan;

determining a markdown to be applied to at least one of the first retail price and the second retail price based on at least one of the first updated sales data, the second updated sales data, the first exception and the second exception; and adjusting at least one of the first retail price and the second retail price by the markdown.

16. The computer readable medium for controlling pricing using the markdown profile according to claim 15, wherein the first product and the second product comprise attribute including at least one of product type, color, size, distribution channel and sales organization.

17. The computer readable medium for controlling pricing using the markdown profile according to claim 15, wherein at least one of the markdown profile, the first markdown profile and the second markdown profile comprises at least one attribute field containing product attribute data used to determine relevance of at least one the markdown profile, the first markdown profile and the second markdown profile to at least one of the first retail product and the second retail product and wherein the selecting of at least one of the markdown profile, the first markdown profile and the second markdown profile is based on the product attribute data.

18. The computer readable medium for controlling pricing using the markdown profile according to claim 15, wherein the selecting of at least one of the markdown profile, the first markdown profile and the second markdown profile is further based on a reaction strategy for sale of at least one of the first product and the second product.

19. The computer readable medium for controlling pricing using the markdown profile according to claim 18, wherein the reaction strategy is at least one of aggressive, defensive and normal.

20. The computer readable medium for controlling pricing using the markdown profile according to claim 15, wherein the selecting of at least one of the markdown profile, the first markdown profile and the second markdown profile is further based on a sales profile for sale of at least one of the first product and the second product.

21. The computer readable medium for controlling pricing using the markdown profile according to claim 20, wherein the sales profile is at least one of linear, progressive and declining.

22. The computer readable medium for controlling pricing using the markdown profile according to claim 15, wherein the second markdown profile is specific to the second product.

23. The computer readable medium for controlling pricing using the markdown profile according to claim 15, wherein the markdown is expressed as percentage discount.

24. The computer readable medium for controlling pricing using the markdown profile according to claim 15, further comprising the step of providing a user with a plurality of markdown profiles from which to select.

25. The computer readable medium for controlling pricing using the markdown profile according to claim 24, wherein the selecting step further comprises toggling between a plurality of markdown profiles through a single action by the user.

* * * * *